United States Patent

[11] 3,579,211

[72] Inventor Raymond B. Larsen
Riverton, Wyo.
[21] Appl. No. 766,677
[22] Filed Oct. 11, 1968
[45] Patented May 18, 1971
[73] Assignee Datel Corporation
Falls Church, Va.

[54] READ-AFTER-WRITE VERIFICATION OF DATA ON MAGNETIC STORAGE MEDIUM
14 Claims, 1 Drawing Fig.

[52] U.S. Cl. .......... 340/174.1
[51] Int. Cl. .......... G11b 5/44
[50] Field of Search .......... 340/174.1 (A,B,I), 146.1 (Inquired); 179/100.2 (E)

[56] References Cited
UNITED STATES PATENTS

| | | | |
|---|---|---|---|
| 3,243,789 | 3/1966 | Ragle, Jr. .......... | 340/174.1 |
| 3,328,788 | 6/1967 | Taris .......... | 340/174.1 |
| 3,359,548 | 12/1967 | Yoshii et al. .......... | 340/174.1 |

OTHER REFERENCES
Harbour, W.P. et al., " Block Return Synchronization For Communication Terminals" , IBM Tech. Disc. Bull., Vol. 9, No. 12, May 1967, pp 1725— 1727

*Primary Examiner*—James W. Moffitt
*Assistant Examiner*—Vincent P. Canney
*Attorney*—John E. Reilly

ABSTRACT: Verification of data recorded on a magnetic storage medium is accomplished by reversibly driving the medium past a common record/reproduce head in order to successively record and play back each character of information and to verify the data recorded by comparing the information played back with the input data supplied for recording.

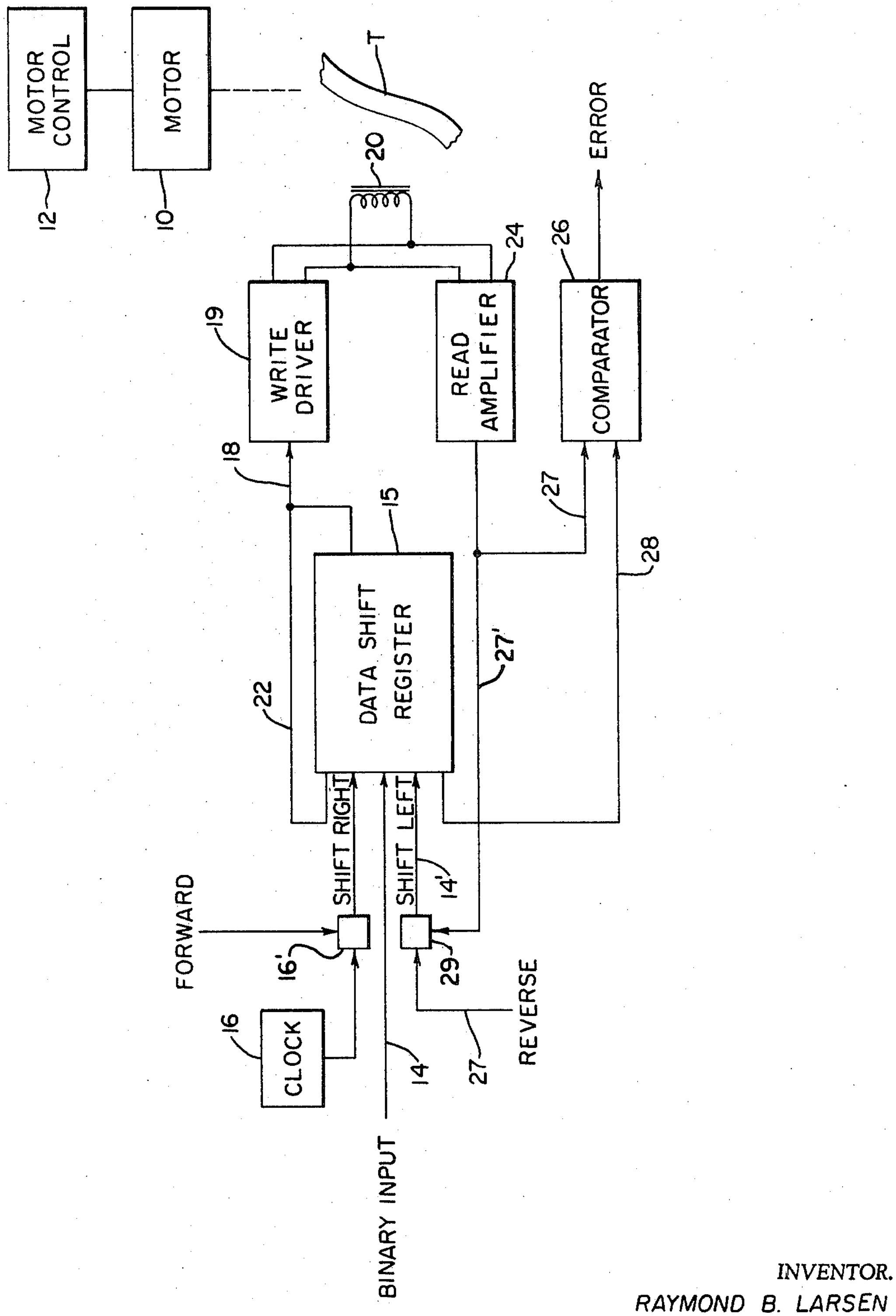
INVENTOR.
RAYMOND B. LARSEN
BY
John E. Reilly
ATTORNEY

READ-AFTER-WRITE VERIFICATION OF DATA ON MAGNETIC STORAGE MEDIUM

This invention relates to a novel and improved recording system and more particularly relates to a method and means for verifying information recorded on a magnetic storage medium.

In recording data on magnetic tape, especially for data processing systems, it is important to provide some means for verifying or error-checking the data recorded. Typically, errors occur in recording on magnetic tape either as a result of spurious signals or nonuniformity in magnetization of the tape; also the tape is subject to wear under repeated use, as a result of which portions of the tape are not readily susceptible to magnetization. In the past, verification or error-checking of recorded data has been done generally by juxtaposition of separate recording and playback heads in the direction of tape movement so that after the data is recorded by the recording head it is played back by the read head to determine reproduction accuracy; or a common head has been utilized to record and simultaneously play back information on separate circuits to determine reproduction accuracy. In both systems however the tape runs continuously in the forward direction and no provision is made for erasure of erroneous recordings prior to advancement to each next section of tape; and an error is indicated usually by generation of an error signal at the end of each erroneous recording.

It is highly desirable to utilize a single magnetic record/reproduce head which is capable of performing all three functions of write, read and verification through the simple expedient of reversing the travel or motion of the tape at the end of each character or unit of information recorded. The method and means devised for accomplishing same eliminate the need for a separate reproducing head while permitting immediate verification of the information and further permitting immediate erasure and rewriting of the erroneous information. It is therefore an object of the present invention to provide for a novel and improved method and means for verifying information recorded on a magnetic storage medium in a reliable, accurate and efficient manner.

It is another object to provide in a data processing system for verification of data recorded on a magnetic storage medium through a single transducing element capable of recording and reproducing the information on the medium and specifically wherein the data may be verified by reversibly driving the magnetic storage medium past the transducing element.

It is a further object of the present invention to enable quick accurate comparison of the data recorded on a magnetic storage medium with the input data to be recorded through the simple expedient of reversing the direction of movement of the magnetic storage medium; and further, wherein the character block may be verified, erased and, if necessary, rewritten before proceeding to each next character to be recorded.

In accordance with the present invention, information to be recorded on a magnetic storage medium, such as, a magnetic tape, can be immediately verified as it is written by controlling the direction or motion of the tape. The input data bits are sequentially transferred from a data register to a common record/reproduce head for transcription on the tape as the latter is driven in one direction, and the bits are stored in the same or a separate register for comparison. After all bits of data in a character have been recorded on the tape, the direction of tape motion is reversed, and the character is played back by the head for comparison with the data bits stored in the register. If the bits recorded do not correspond with the bits held in the register, an error signal may be developed, for instance, to generate another "write" sequence over the erroneous information recorded or to generate an "erase" sequence to remove the erroneous information.

The above and other objects, advantages and features of the present invention will be more readily understood from a consideration of the following detailed description of a preferred embodiment of the present invention when taken together with the accompanying drawing of a functional block diagram of the preferred embodiment of the present invention.

Referring in more detail to the drawing, there is shown by way of illustrative example a functional block diagram of a circuit for processing information on a magnetic storage medium, such as, for instance, a magnetic tape T, the tape being driven by a reversible motor represented at 10. In the embodiment shown, the motor is driven under the control of a digital pulse motor control circuit represented at 12 and which is preferably of the type set forth and described in application Ser. No. 680,086, filed Nov. 2, 1967, now Pat. No. 3,514,679, issued 26 May, 1970 and assigned to the assignee of the present invention. Briefly in the motor control circuit described in said copending application, a magnetic tape or other recording medium can be reversibly driven at a constant speed level for writing character blocks of binary information thereon. Timing pulses are developed in direct proportion to actual motor speed and are compared with the selected time constant of a monostable multivibrator to generate and apply motor energizing pulses both to accelerate the motor to a selected speed and to hold it at that level either for writing or reading information on the tape. Clock pulses may be derived from the timing pulses in order to time a counting circuit as well as to time the reading and writing of the binary bits of information. Thus in writing each character, which is comprised of a succession of binary bits, the tape may be advanced the number of counts or pulses needed to accelerate the tape to a given speed level and to write each bit in the character.

Thereafter the tape is reversed through a corresponding number of counts in order to read each character written for the purpose of error-checking the same, followed by reversing the tape once again to drive it in a forward direction through the same number of counts. As stated, in addition to the counts or pulses applied for the information bits constituting each character of information, pulses are provided at the beginning and end of each character to permit the motor to accelerate to the constant speed level both in the forward and reverse directions; and, at the end of the second reversal, the tape may be advanced an additional number of counts or pulses to establish an intercharacter gap between characters. While the present invention is by no means limited to the type of motor control circuit described in said copending application, the motor control circuit possesses the advantage of driving the tape at a substantially constant speed in either direction of travel so as to minimize errors resulting from speed variations in the tape drive.

The present invention may be best exemplified by reference to its use in a data processing system where typically each unit of information or character is expressed in terms of a binary code in the form of data bits of different polarity represented either by a binary ONE or ZERO, and the bits comprising each character are to be recorded either serially or in parallel on the magnetic tape T. In the present invention illustrated in the drawing, a source of binary bits or signals is designated at 14. In accordance with conventional practice, each series of bits representing a character may be stored or loaded into data shift register 15 either in series or in parallel. In this connection, the data shift register may suitably comprise a series of flip-flop stages, each stage capable of being advanced to one of two stable conditions according to the polarity of each bit which is loaded into each successive stage of the shift register.

The information or data bits loaded into the register are sequentially transferred over line 18 to write driver circuit 19 for a common record/reproduce head 20, and the bits are successively shifted out of the register under the control of a clock pulse source 16. Clock pulses are applied over the "Shift Right" line to the register when gate 16′ is enabled by a "write forward" signal applied over the "Forward" line. In other words when the tape is driven in a forward direction to write each character this condition is indicated by a "forward" signal applied to the gate 16′ to enable the gate for delivery of clock or timing pulses to order the bits out of the register. The timing pulses generated by the motor control circuit to control the speed and direction of travel of the motor drive may also define the clock pulse source; or a separate source of clock pulses may be provided. Each series of bits ordered out of the register are successively shifted back into the register 15 over line 22 in order to store the information in the register for later comparison with the information to be read back from the tape. For this reason, the shift register is preferably a right circular shift register in order to store the bits received in the proper order for later comparison.

As the bits are successively applied through the write driver circuit 19 the magnetic tape is driven in a forward direction through a predetermined number of counts under the control of the digital pulse motor control circuit 12, and each bit is suitably recorded by impression of a magnetic analog of the bit onto the magnetic tape. After writing the bits in each character, the motor is driven forwardly in the same direction for an additional number of counts prior to its reversal so that, in reversing, the motor is permitted to accelerate in the reverse direction through that number of counts to the constant speed level for its return over the character for reading purposes. A counting circuit, not shown, but which forms a part of the motor control circuit, can be utilized to apply a control signal to reverse the tape drive motor to signal the end of the "record" condition and the beginning of the "read" condition. In the reverse direction, the motor is accelerated to the constant speed level to permit reading of the bits recorded on the tape by the head 20 and for applying same in the form of pulses to a read amplifier circuit 24.

An instantaneous comparison of the information bits played back from the tape with the information bits in the data shift register is made through a comparator circuit 26. An amplified pulse is developed in the amplifier circuit in response to each pulse generated by the reproduce head 20, and each amplified pulse is applied over line 27 to comparator circuit 26 and over line 27' to gate 29 at the input side of the shift register 15. A "Reverse" signal is developed by the motor control circuit when the tape motor drive is reversed and is applied to enable the gate 29 for delivery of the amplified pulses over the "Shift Left" line whereby to shift the bits stored out of the data shift register. The stored bits are delivered over line 28 to the comparator circuit in the same order as, and in synchronization with, the bits played back from the tape. In other words, since the bits are read back in reverse order, the bits stored in the register are correspondingly shifted out of the register in the same reverse order. If negative logic is employed, the comparator circuit may be suitably comprised of a NOR gate which will produce an error signal only when a signal is received from one of the control lines 27 or 28; otherwise, if signals are simultaneously received from control lines 27 and 28, indicating proper recording of the information on tape, no error signal is produced. Of course, as a suitable alternative, a NAND gate may be employed to produce nonerror signals in response to simultaneous arrival of bits or pulses stored in the register and applied from the read amplifier circuit. In either case, if the bits do not correspond an error signal is generated by the comparison circuit.

The tape is run in the reverse direction over the same number of counts to read back the character before returning to its original direction of travel. When the tape is returned to run in the forward direction over the character first written, an error signal, if present, may be used to initiate another "write" sequence in order to rewrite the character over the erroneous character; or, depending upon the logical circuitry employed, may be utilized to initiate an "erase" sequence to erase the erroneous information. In the absence of an error signal, the record/reproduce head may remain in the read condition and, at the end of the character, the medium may be advanced forwardly through an additional number of counts to form an intercharacter gap prior to writing the next character in succession.

It will be seen from the foregoing that the sequence of read, write and verification may be varied in relation to tape drive motion. For instance, the tape may be erased when it is initially advanced in the forward direction, followed by writing in the reverse direction, reading in the forward direction and verifying by comparison in the manner described. Another alternative is to write in the forward direction, read in the reverse direction and read again in the next forward direction to verify; or, to read and verify in the reverse direction after writing in the forward direction and thereafter to write, read forward or erase depending upon the outcome of verification of the character block recorded. Still another alternative is to follow the same essential procedure, as outlined in the preferred form illustrated, wherein the system writes forward and reads in reverse to error-check and complete the verification of the first character. In each sequence, the tape is run continuously in a forward direction over the counts, or spacing, necessary to pass over the character written, establish a gap, and write the second character, followed by reversal of the tape back to the beginning of the second character. In passing over each character written, the head either may read or erase if the character is erroneous. Of course the desirability of adopting such variations will depend largely upon the requirements of the system, the logical circuitry employed, and the intended application and technique. Moreover, the method and apparatus described is conformable for verification of information recorded in parallel through a plurality of juxtaposed record/reproduce heads by reversing the tape to read and to verify after each parallel bit recording.

A recording system which lends itself particularly well to the method and apparatus of the present invention is that described in copending application entitled METHOD & APPARATUS FOR PROCESSING DATA, Ser. No. 751,884, filed Aug. 12, 1968, also assigned to the assignee of the present invention. Each binary bit is represented on tape by the combination of a positive and a negative pulse, and the order in which the positive pulse and the negative pulse is recorded will determine whether the bit is a binary ONE or ZERO. Accordingly when the information is read from the tape, the leading and trailing ends of each pulse may be differentiated and decoded either to a binary ONE or ZERO. Moreover, the recorded information can be error-checked in the manner described in said copending application without comparison or reference to the input data. Of course in the circuitry described the information may be verified employing other forms of conventional error-checking circuitry without comparison with the input data, such as, by counting the number of bits in each character.

It is therefore to be understood that various modifications and changes may be made in the specific apparatus and sequence of steps followed in verification of data represented in binary form without departing from the spirit and scope of the present invention as defined by the appended claims.

I claim:

1. A read-after-write verification system for characters of information recorded serially in binary form on a movable magnetic storage medium comprising a common record/reproduce head including separate record and read circuits adapted to be selectively energized for recording and playback of information on the medium, respectively, a data shift register including means for loading a series of data bits defining each character into said register, means for sequentially transferring the bits from said register to said record circuit for recording in serial form on the medium by said head including means simultaneously storing the bits transferred for recording, a motor control circuit including motor drive means for reversibly driving the movable magnetic storage medium, activating means causing said motor drive means to advance the medium in one direction over a predetermined number of counts as each character is recorded on the medium and further causing said motor drive means to successively drive the recording medium first in the reverse direction and then in the forward direction over the character recorded, said read circuit being activated when the medium is successively driven either in the reverse or forward direction to read the character recorded, and comparison means for comparing the bits reproduced by said read circuit with the bits stored including means for generating an error signal whenever the bits reproduced from the medium do not correspond with the bits stored in said data shift register.

2. A system according to claim 1 wherein said means for storing each series of bits is operative to store the bits in said register for subsequent comparison in the same order as the bits are reproduced.

3. A system according to claim 1, further characterized by reproducing the character block when the medium is driven in the reverse direction, and rerecording the character block in response to an error signal when the medium is thereafter driven in the forward direction over the original character block recorded.

4. A system according to claim 1, further including means associated with said record/reproduce head for erasing characters recorded on the medium, said erasing means being activated in response to an error signal generated by said comparison means.

5. A system according to claim 1 wherein the medium is defined by a magnetic tape and said motor control circuit is defined by a digital pulse motor control circuit including a DC motor for reversibly driving the magnetic tape at a constant speed under the control of digital pulses generated by said motor control circuit.

6. In a system for recording characters each coded into a series of binary bits of information on a movable recording medium, the combination comprising:

recording means for recording each series of binary bits of information on the medium and reproducing means for reproducing each series of binary bits of information so recorded on the medium, storage means including means for loading each series of binary bits of information into said storage means and means for transferring each of said series of binary bits from the storage means to said recording means for recording on the movable recording medium, motor drive means for alternately and reversibly driving said medium in opposite directions for recording the binary bits of information transferred to said recording means and for reproducing the binary bits of information recorded, and comparing means for comparing each of the binary bits of information in each series reproduced from the medium with the corresponding series of binary bits of information in each series transferred from said storage means for recording.

7. In a system according to claim 6 wherein the movable recording medium is driven in opposite directions for a predetermined number of counts to successively record and to reproduce the binary bits of information in each character recorded, and means associated with said comparing means to generate an error signal when a character reproduced does not correspond with the information to be recorded.

8. In a system according to claim 7, further including means responsive to generation of an error signal to rerecord the binary bits of information in each character compared when the movable storage medium is reversed and driven in the one direction.

9. In a system according to claim 7, further including means responsive to generation of an error signal to erase the binary bits of information in the character recorded when the movable storage medium is reversed and returned in the one direction.

10. In a system according to claim 7, said motor drive means being operative in succession to advance the medium in a forward direction for recording each character, reverse the medium past the character recorded, and again reverse the medium to return in the forward direction and reproduce the character recorded.

11. The method of verifying characters of information each coded into a series of binary bits recorded serially on a movable recording medium, comprising the steps of:

serially recording the binary bits in each character of information on the recording medium, reversing the direction of movement of the recording medium and reading the binary bits in each character of information recorded, comparing the binary bits in each character block read with the corresponding binary bits in each corresponding character recorded, and generating an error signal whenever the character read does not correspond with the character to be recorded.

12. The method of verifying data according to claim 11, comprising the additional step of advancing the recording medium in the one direction of movement and erasing the binary bits in each character recorded whenever an error signal is generated.

13. The method according to claim 11 being further characterized by the step of recording the binary bits in each character when the recording medium is advanced in the forward direction, reversing the direction of travel of the recording medium to its starting point and reading the binary bits in the character recorded in the same order as recorded.

14. The method according to claim 11 further characterized by erasing the recording medium over a predetermined number of counts, reversing the recording medium to write the binary bits in each character, and again reversing the recording medium to read the corresponding binary bits in each character recorded.